United States Patent [19]

Deckers et al.

[11] Patent Number: 5,739,242

[45] Date of Patent: Apr. 14, 1998

[54] PREPARATION OF COPOLYMERS OF ETHYLENE WITH ALKENECARBOXYLIC ACIDS

[75] Inventors: Andreas Deckers, Flomborn; Dieter Littmann, Mannheim; Roger Klimesch, Alsbach-Hähnlein, all of Germany

[73] Assignee: BASF Aktiengesellschaft, Ludwigshafen, Germany

[21] Appl. No.: 544,442

[22] Filed: Nov. 17, 1995

[30] Foreign Application Priority Data

Nov. 24, 1994 [DE] Germany .......... 44 41 822.1

[51] Int. Cl.⁶ .......... C08F 220/04
[52] U.S. Cl. .......... 526/318.6; 526/348
[58] Field of Search .......... 526/318.6, 348

[56] References Cited

U.S. PATENT DOCUMENTS 2,387,755  10/1945  Edward .......... 526/64
4,351,931   9/1982  Armitage .......... 526/227

FOREIGN PATENT DOCUMENTS 017 229  10/1980  European Pat. Off. .
318058    5/1989  European Pat. Off. .
449092   10/1991  European Pat. Off. .
573868   12/1993  European Pat. Off. .
1503397   3/1978  United Kingdom .

*Primary Examiner*—Thomas R. Weber
*Attorney, Agent, or Firm*—Keil & Weinkauf

[57] ABSTRACT

A process for the preparation of copolymers of ethylene and dicarboxylic acid in the presence of a free-radical inhibitor. The process comprises of warming a mixture of ethylene and $C_3$–$C_6$-alkenecarboxylic acid to a temperature of from 60° to 100° C. before addition of the free-radical inhibitor. The maximum polymerization temperature to recover said copolymers of ethylene is in the range of from 100° to 260° C.; and wherein said copolymer comprises from 94 to 99.5 mol % of ethylene and from 0.5 to 6.0 mol % of $C_3$–$C_6$-alkenecarboxylic acid.

2 Claims, No Drawings

5,739,242

PREPARATION OF COPOLYMERS OF ETHYLENE WITH ALKENECARBOXYLIC ACIDS

BACKGROUND OF THE INVENTION

The present invention relates to a process for the preparation of copolymers of ethylene comprising a) from 94 to 99.5 mol % of ethylene and b) from 0.5 to 6 mol % of a $C_3$- to $C_6$-alkenecarboxylic acid by free-radical-initiated high-pressure polymerization of the monomers in a tubular reactor.

The present invention furthermore relates to the copolymers of ethylene and to the use of the copolymers of ethylene as claimed in claims 1 to 4 for the production of adhesion promoters, films, fibers or moldings and to the adhesion promoters, films, fibers and moldings obtainable in this process.

DESCRIPTION OF THE PRIOR ART

As is known, copolymers of ethylene with alkenecarboxylic acids are used for the production of films and moldings of all types. In addition, these copolymers are frequently used as adhesion promoters between polar and nonpolar materials.

The preparation of copolymers of ethylene with alkenecarboxylic acids has been described in U.S. Pat. No. 4,351,931 and EP-A 0 017 229. The copolymerization reactions described therein were carried out in high-pressure stirred autoclaves.

However, relative aggressive comonomers such as alkenecarboxylic acids can cause corrosion problems in this polymerization process, for example in the stirrer unit, making the stirred autoclave process disadvantageous from a technical and economical point of view.

It is an object of the present invention to provide a process for the preparation of copolymers of ethylene and alkenecarboxylic acids which does not have said disadvantages.

We have found that this object is achieved by a process for the preparation of copolymers of ethylene comprising a) from 94 to 99.5 mol % of ethylene and b) from 0.5 to 6 mol % of a $C_3$- to $C_6$-alkenecarboxylic acid by free-radical-initiated high-pressure polymerization of the monomers in a tubular reactor, where the monomer mixture is warmed to a maximum of 100° C. before addition of the initiator, and the polymerization temperature does not exceed a maximum of 260° C.

The fundamental features of the high-pressure polymerization process for the preparation of ethylene polymers in tubular reactors has already been described in Ullmann's Encyclopedia of Industrial Chemistry, 5th Edition, Vol. A21 (1992), pp. 506 to 509.

SUMMARY OF THE INVENTION

The novel copolymerization of ethylene with alkenecarboxylic acids is generally carried out in tubular polymerization reactors (tubular reactors) whose length is at least 1000 times, preferably at least 3000 times, in particular from 5000 to 50000 times, their internal diameter.

In the novel process, the monomers are polymerized at a pressure in the range from 30,000 to 500,000 kPa, preferably from 100,000 to 400,000 kPa, in particular from 150,000 to 350,000 kPa.

The monomer mixture is warmed, before the polymerization zone, to a maximum of 100° C., preferably to from 50° to 100° C., in particular to from 70° to 100° C.

The temperatures in the polymerization zone are below 260° C., preferably from 50° to 260° C., in particular from 100° to 240° C. For product quality reasons, the polymerization temperature must not exceed 260° C.

The polymerization temperature is generally controlled by the rate of addition of the free-radical polymerization initiators.

Suitable comonomers in the novel process are monobasic or polybasic alkenecarboxylic acids having 3 to 6 carbon atoms. Examples of such $C_3$- to $C_6$-alkenecarboxylic acids are acrylic acid, methacrylic acid, crotonic acid, isocrotonic acid, vinylacetic acid, maleic acid and fumaric acid. Preference is given to acrylic acid or methacrylic acid, in particular acrylic acid.

The copolymerization is generally carried out in the presence of free-radical initiators, which have already been described in EP-A 0 017 229. No particular requirements are made of the free-radical initiators in the novel process apart from that they decompose to form free radicals at as low as from about 50° to about 100° C. and/or that free radicals can be generated from reaction with other molecules in the reaction mixture.

Suitable examples of free-radical initiators are peroxides, such as tert-butyl perpivalate, di-tert-butyl peroxide, tert-butyl hydroperoxide, tert-butyl perbenzoate, dilauryl peroxide, tertbutyl perisononanoate and 1,1-di-tert-butylperoxycyclohexane. Preference is given to tert-butyl perpivalate, tert-butyl perisononanoate and 1,1-di-tert-butylperoxycyclohexane.

The free-radical initiators are added to the polymerization mixture in an amount of from 1 to 10000 mol-ppm, preferably from 10 to 1000 mol-ppm, based on the amount (in mol) of monomers.

It is of course also possible to use mixtures of the free-radical initiators in any desired mixing ratio of the components.

It has proven advantageous to dissolve the free-radical initiators in solvents.

Suitable solvents are aliphatic and aromatic hydrocarbons, for example hexane, heptane, octane, nonane, decane, isodecane, toluene and ethylbenzene. The concentration of the free-radical initiator, based on the solution, is in the range from 1 to 50% by weight, preferably in the range from 5 to 30% by weight.

The molecular weight of the copolymers is controlled using the regulators usually used for this purpose in the high-pressure polymerization process, such as hydrocarbons, for example propane, propene or butene, and/or organic carbonyl compounds, for example acetone, ethyl methyl ketone or propionaldehyde. Particularly advantageous molecular weight regulators have proved to be propene, butene and propionaldehyde.

The novel polymers generally have melt flow indices, measured in accordance with DIN 53 735 at from 190° C. and a weight of 2.16 kg, in the range from 0.1 to 100 g/10 min, preferably from 2 to 20 g/10 min.

The $C_3$- to $C_6$-alkenecarboxylic acid content of the novel ethylene copolymers, determined by titration with potassium hydroxide solution, is from 0.5 to 6 mol %, preferably from 3 to 6 mol %.

The ethylene-alkenecarboxylic acid copolymers prepared by the process described adhere strongly to metals, as determined by the method described in EP-B 0 157 107. Furthermore, the films produced from the novel copolymers of ethylene have a low fisheye content, determined visually.

DESCRIPTION OF THE PREFERRED EMBODIMENTS

EXAMPLES

The copolymerization of ethylene was carried out in a high-pressure tubular reactor with a length/diameter ratio of 10000.

The acrylic acid and the regulator (propionaldehyde) were metered into the ethylene stream at a point between the precompressor and the postcompressor. When the reaction mixture had been compressed to 230,000 kPa, it was warmed to 80° C. and subsequently passed into the polymerization reactor. A mixture of 0.5 mol/l of tert-butyl perpivalate and 1 mol/l of 1,1-di-tert-butylperoxycyclohexane, dissolved in isodecane, were added at the inlet to the S-reactor. The rate of addition of the initiator mixture was selected so that the maximum temperature in the polymerization zone did not exceed 240° C. After 2-stage decompression of the reaction mixture, the ethylene-alkenecarboxylic acid copolymer was discharged with the aid of an extruder, and unreacted ethylene was recycled into the process.

The properties of the polymer are shown in the table.

TABLE

Ethylene/acrylic acid copolymers

| Example No. | Acrylic acid content of the polymer [mol %] | MFI [g/10 min] | Adhesive strength to Al [N/10 mm] |
|---|---|---|---|
| 1 | 3.4 | 8,8 | 41 |
| 2 | 4.2 | 7,2 | 46 |
| 3 | 5.1 | 14,7 | 52 |

Comparative Example

The comparative example was carried out by the process described in U.S. Pat. No. 4,351,931, giving an ethylene-acrylic acid copolymer having an acrylic acid content of 4.6 mol %, an MFI of 10.1 g/10 min and a lower adhesive strength to aluminum of 19N/10 mm.

We claim:

1. A process for the preparation of copolymers of ethylene and dicarboxylic acid in the presence of a free-radical initiator, said process comprising warming a mixture of ethylene and $C_3$–$C_6$-alkenecarboxylic acid to a temperature of from 60° to 100° C. before addition of the free-radical initiator; and recovering said copolymers of ethylene; wherein the maximum polymerization temperature is in the range of from 100° to 260° C.; and wherein said copolymer comprises from 94 to 99.5 mol % of ethylene and from 0.5 to 6.0 mol % of $C_3$–$C_6$-alkenecarboxylic acid.

2. The process of claim 1, wherein the polymerization temperature is from 100° to 240° C. the mixture of ethylene and $C_3$–$C_6$-alkenecarboxylic acid is warmed to a temperature of 70° to 100° C. and the amount of $C_3$–$C_6$-alkenecarboxylic acid in the mixture is from 3 to 6 mol %.

* * * * *